Sept. 19, 1944.                B. SASSEN                 2,358,478
                            ROTARY SLIDE RULE
                    Filed Jan. 23, 1942          6 Sheets-Sheet 1

INVENTOR.
BERNARD SASSEN.
BY *H.C. Kavel.*
ATTORNEY.

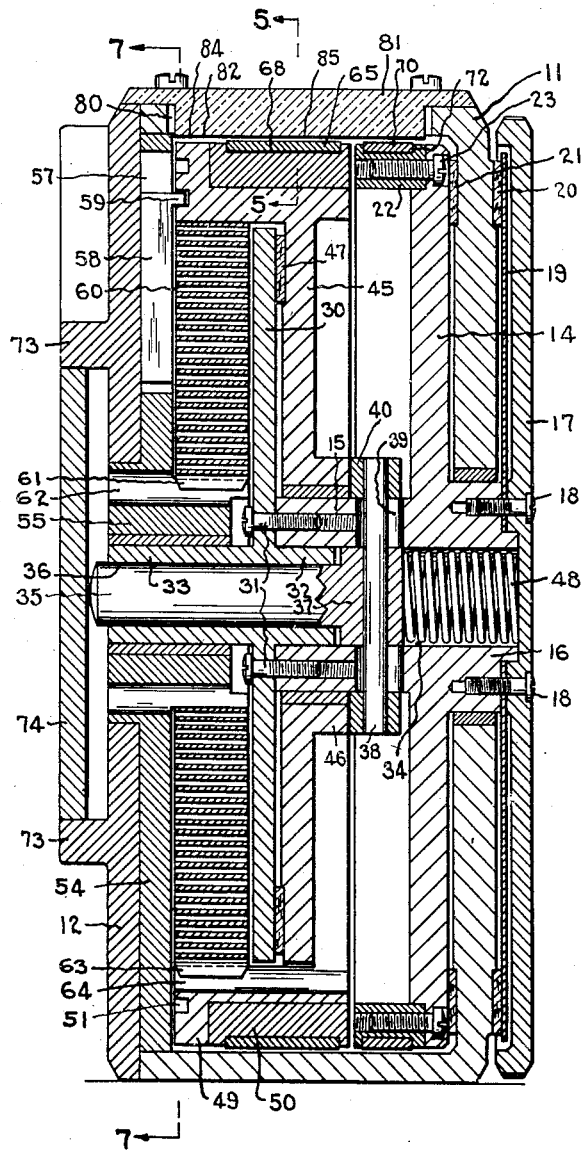

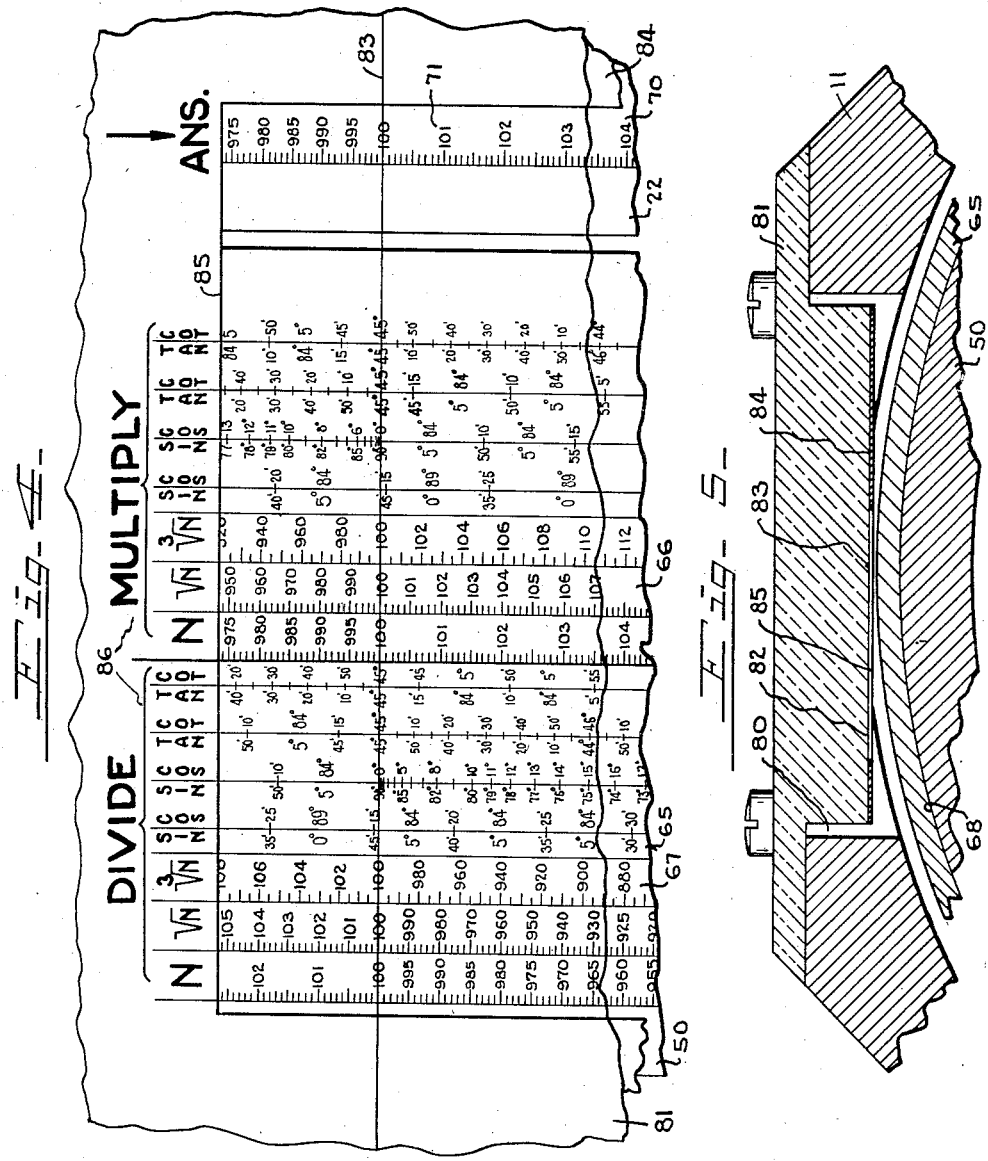

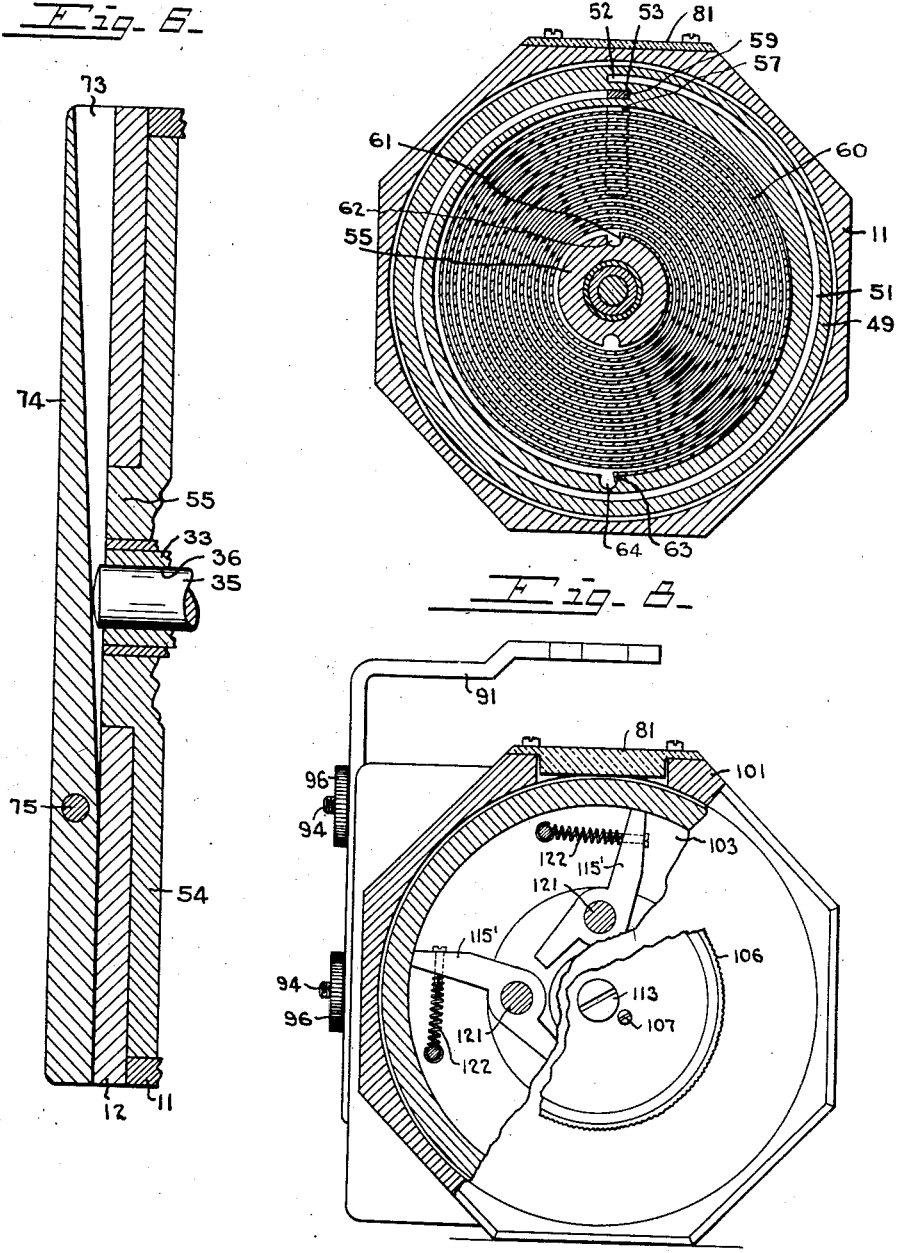

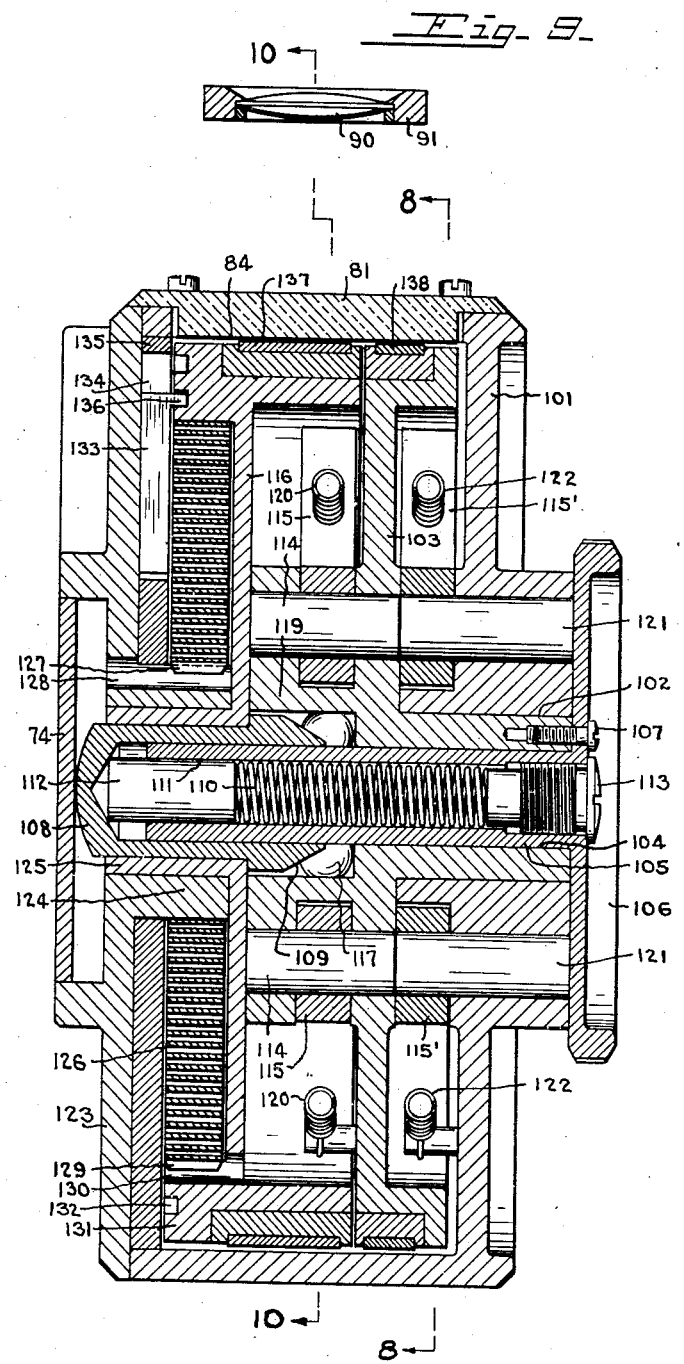

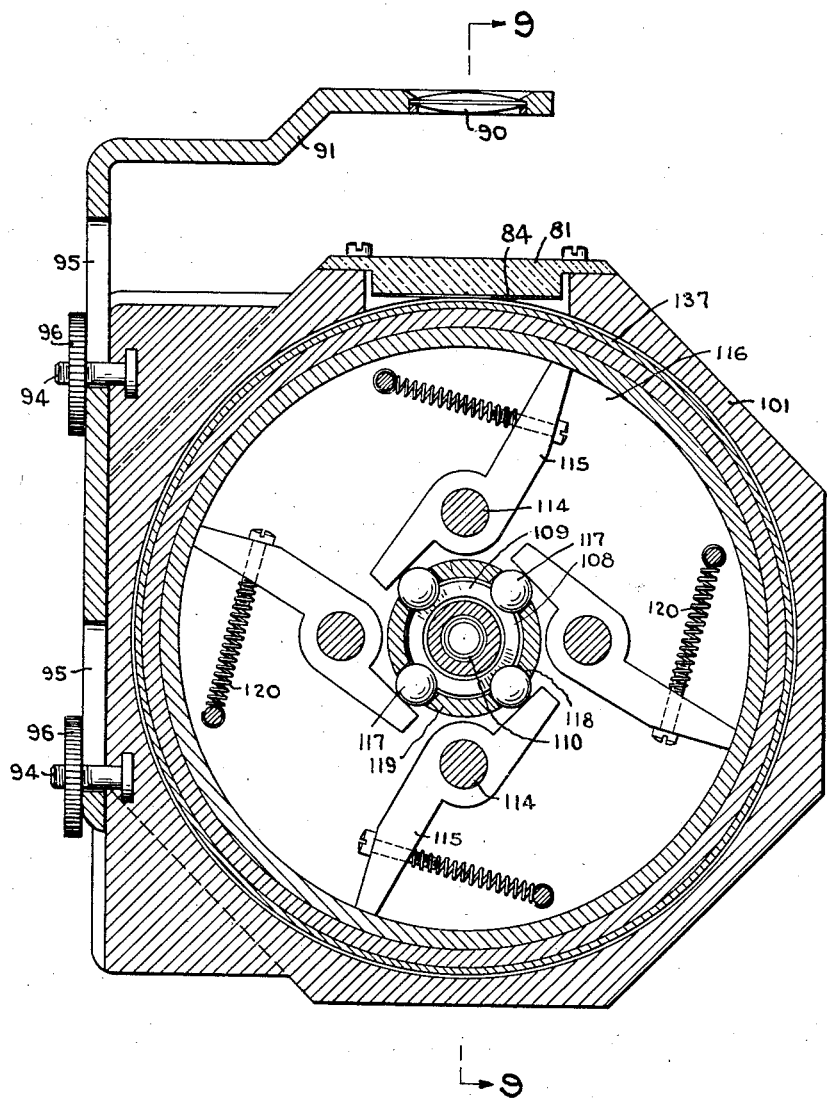

Patented Sept. 19, 1944

2,358,478

UNITED STATES PATENT OFFICE 2,358,478

ROTARY SLIDE RULE

Bernard Sassen, Springfield, Vt.

Application January 23, 1942, Serial No. 427,848

11 Claims. (Cl. 235—79.5)

This invention relates to a rotary slide rule for quickly and accurately determining the multiplication and/or division of a plurality of various figures through the process of rotating a hand knob and operating a trip lever.

In the usual slide rule, it is often necessary to transfer figures from one side of the rule to the other side to complete a given calculation, together with a movement of the cursor along the scale when more than two values are involved in the calculation, with the resultant difficulty of accurately setting the scales and cursor to obtain the correct result, while in the present invention, the cursor is on a fixed window of a housing in which the scales revolve by means of a rotary movement of a hand knob under tension, permitting a quick and accurate setting of the scales. In all other slide rules whether straight-line or rotary, in order to multiply or divide by a series of values it is necessary to position one of the scales to unity and then to position either the cursor or one of the scales to the desired factor or divisor. In my improved device the positioning to unity is accomplished automatically merely by pressing a release lever.

The repetition of two simple operations for each factor or divisor involved in the calculation is all that is necessary to complete any calculation within the scope of the scales, namely; rotating a hand knob and depressing a trip lever.

Furthermore, the invention contemplates the use of microscopic scales in association with microscopic legends inscribed on a mask having an opening which permits a minute portion of the scales to be visible adjacent to the hair-line. Such scales permit the use of a number of digits opposite the calibrations, thereby reducing the danger of misreading the scales and yet confining the device to a small and portable instrument. The advantages inherent in the use of microscopic legends and scales are to increase the effective or apparent length of the scale without increasing the actual physical magnitude, and the ability of having a large number of scales in the instrument confined within a narrow band, thus reducing the field and permitting the use of a small microscope with a great magnification.

In previous slide rules when multiplying and/or dividing more than two numbers, there are two fine-setting operations needed for each subsequent number: (1) the bringing of unity on the sliding scale to the cursor, and (2) the bringing of the cursor to the succeeding factor or divisor. Since in making such calculations, it is this fine-setting that consumes the greatest part of the time in completing calculations, the use of almost instantaneous and automatic means to effect one of these two fine-setting operations, namely; the bringing of unity on the sliding scale to the cursor, the total time for the entire calculation may be virtually halved when several factors or divisors are involved. Furthermore, since the accuracy of the final answer depends to a large extent on the accuracy with which each positioning operation is performed, this automatic and therefore completely accurate means for performing one-half of the total number of settings may be said to halve the possibility of total error.

The object of the invention is to provide a small device capable of great accuracy and having a number of various mathematical scales rotatable into registry with a fixed hair-line, wherewith a speedy result can be obtained in either multiplication and/or division, through the simple procedure of rotating a hand knob and operating a release lever.

A further object of my invention is to provide a pair of rotatable members having a correlated actuation through the medium of a hand knob in opposition to retracting means imposed on one of the members, means for disengaging said members from each other, and thus permitting said retracting means to return the released member to unit position while the other member is retained in set position.

A further object is to provide a series of microscopic scales on one of the rotatable members and a microscopic answer scale on the other rotatable member in association with a fixed hair-line and an adjustable magnifying lens through which the scales can be read.

A further object is to completely encase the microscopic scales, which because of their minuteness would otherwise be vulnerable to damage.

A further object is to frame only a minute portion of the slide rule to expedite reading of the scales reducing the field of the microscope, thereby permitting greater magnification.

A further object of the invention is to provide a device whereby all calculations are made through two basic operations, each of which is entirely controlled by either the left or right hand, with one hand used entirely for the purpose of setting to unity, and the other hand to setting the next factor, thereby reducing the danger of confusion which so often results in the use of the ordinary slide rule.

A further object is to provide an opaque shield in association with the hair-line having suitable legends thereon for informative reading of the scales, said shield having an opening to permit a portion of the scales to be visible adjacent to the cursor.

Further objects reside in the novel construction of parts.

My invention will be further readily understood from the following description and claims, and from the drawings in which latter:

Fig. 3 is an enlarged axial section of the same, taken in the plane of the line 3—3 of Fig. 2.

Fig. 4 is an enlarged detail plan view of the window, partly broken away, showing the hair-line, mask and scales as viewed through the window.

Fig. 5 is a vertical section of the same, taken in the plane of the line 5—5 of Fig. 3.

Fig. 6 is a detail sectional view, partly broken away, taken in the plane of the line 6—6 of Fig. 2.

Fig. 7 is a vertical sectional view, taken in the plane of the line 7—7 of Fig. 3.

Fig. 8 is a side view of a modified form of my invention, partly broken away and partly in section with the parts thus shown in section, taken in the plane of the line 8—8 of Fig. 9.

Fig. 9 is an axial section of the same, taken in the plane of the line 9—9 of Fig. 10, and;

Fig. 10 is a vertical section of the same, taken in the plane of the irregular line 10—10 of Fig. 9.

Figure 1:
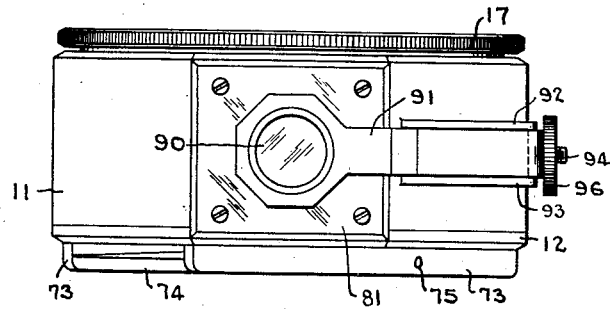
Fig. 1 is a plan view of my improved device.
Figure 2:
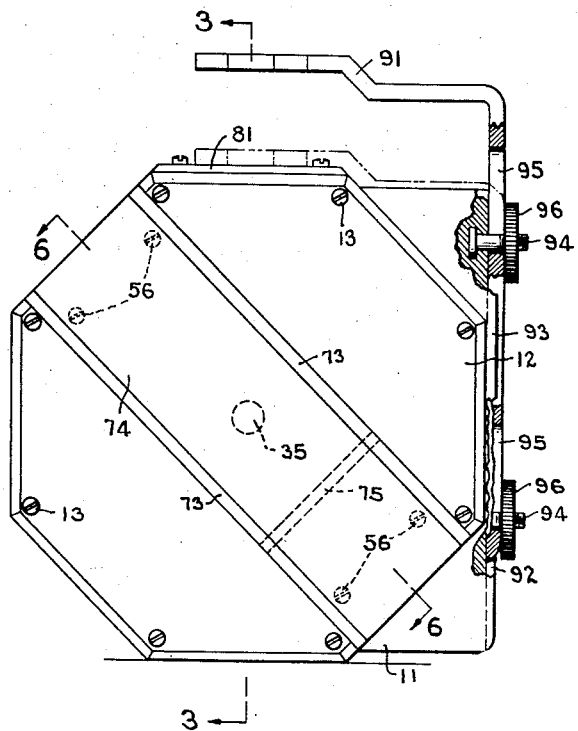
Fig. 2 is a side view of the same, partly broken away.

The various scales of all slide rules start with the numeral 1 and reference to unit position or unity as herein set forth refers to the position of the scales whereby the numeral 1 on the scale will coincide with the hair line.

My improved device comprises a casing 11 having a cover 12 attached thereto as by screws 13. A rotatable member 14 has extending hubs 15 and 16. The hub 16 is journalled in the casing 11 and has a hand knob 17 secured thereto as by screws 18. A spring washer 19 is interposed between the hub 16 and the hand knob 17 creating a pressure against a friction ring 20 secured to the outer face of the casing. A second friction ring 21 is secured to the inner face of the casing and creates a frictional resistance between the casing and the rotatable member 14. A scale-carrying ring 22 is secured to the rotatable member 14 as by screws 23.

A disc 30 is secured to the hub 15 as by screws 31 and has extending hubs 32 and 33. The hub 32 extends into the bore 34 of the hub 15. A trip pin 35 is movable endwise in a bore 36 in the hubs 32 and 33, and is provided with an enlarged head 37 slidable in the bore 34. A pin 38 is carried by and extends transversely through the enlarged end of the trip pin and through an enlarged transverse aperture 39 in the hub 15. The ends of the pin 38 are secured in a collar 40 slidable on the outer periphery of the hub 15.

A rotatable member 45 has a hub 46 rotatable about the hub 15 being positioned between the disc 30 and the collar 40. A friction ring 47 is secured to the member 45, for driving the member 45 through frictional contact with the disc 30, being urged into contact by a coil spring 48 positioned in the bore 34 between the head of the pin 35 and the hand knob 17. The disc 30 is rotated by the hand knob in unison with the member 14.

The rim 49 of the member 45 has a scale carrying ring 50 secured thereto and a formed spiral groove 51 in the outer face, with the ends 52 and 53 of the spiral groove overlapping.

Journalled within the cover 12 is a disc 54 having a hub 55 in which the hub 33 of the disc 30 revolves. The disc 54 is suitably secured to the cover as by screws 56. A slot 57 is formed in the disc 54 for maintaining a key 58. The key 58 is slidable radially in the slot and has an extending lug 59 which rides in the spiral groove 51, thus limiting the rotatable member 45 to slightly in excess of one complete revolution.

Interposed between the rim 49 of the rotatable member 45 and the hub 55 is a spiral spring 60 having one end 61 engaged in an aperture 62 in the hub 55 and the other end 63 engaged in an aperture 64 in the rim, for returning the member 45 to unity position upon depression of the coil spring 48 which is designed to create a frictional driving force greater than that of the spiral spring.

A scale 65 having a plurality of rows of figures thereon for multiplication and/or division, indicated at 66 and 67, is received in a groove 68 in the ring 49. An answer scale 70 having properly arranged figures thereon as indicated at 71 is received in a peripheral groove 72 in the ring 22. Both of these scales completely surround the respective rotatable members and are held in place by any suitable means such as crimping of the edges of the grooves in which they are positioned.

The face of the cover 12 is provided with a pair of ribs 73 between which a trip lever 74 is pivoted on a pin 75 fixed in the ribs. This lever is arranged to actuate the trip pin 35.

Mounted on the top of the casing and extending through an aperture 80 therein, is a transparent member 81 having a face 82 in close proximity to the scales 65 and 70. A hair-line 83 is inscribed on the face 82 and extends tranversely across the scales. An opaque mask 84 is secured to the lower face 82. The center portion of the mask is cut out as at 85 to permit a clear view of the scales adjacent to the hair-line. There are suitable legends, as indicated at 86, on the mask for informative reading of the scales. The scales are of microscopic size and are made visible by means of an enlarging lens 90 suitably secured in an adjustable arm 91. This arm is shaped to fit the casing upon retraction of the lens to provide a compact unit which can be carried in the pocket of the user. The arm 91 is supported between a pair of ribs 92 and 93 on the casing. Screws 94 are molded in the casing and extend through elongated slots 95 in the arm. Nuts 96 are provided to clamp the arm to the casing in any desired position, to suit the focal requirements of the user.

Figs. 8 to 10 show a modified form of the invention, wherein free-wheeling clutches are used to engage the rotary members and to maintain the two scales in unit rotation, in place of the friction rings used in the preferred form of the invention. A casing 101 has a central bore 102 in which the hub of a rotary member 103 is journalled. The rotatable member 103 has a central bore 104 through which the shank 105 of a hand knob 106 extends. The hand knob is secured to the hub of the rotatable member 103 as by screws 107. A cap 108 having a forward tapered face 109 is slidable on the shank 105 being retained in an outward position by means of a spring 110 interposed within the bore 111 of the shank between a pin 112 and a threaded plug 113. A plurality of pins 114 are fixed to the rotatable member 103 and carry clutching arms 115 arranged to engage the inner face of a rotatable member 116 having balls 117 interposed between the arms and the tapered face 109 in apertures 118 in the extended hub 119 of the rotatable member 103. Springs 120 normally urge the arms 115 into contact with the rotatable member 116. Similar arms 115' are pivoted about pins 121 extending from the casing and engage the rotatable member 103 being held in engagement by means of springs 122, but are not releasable. A cover 123 is secured to the casing and has an inwardly extending hub 124 within which the hub 125 of the rotatable member 116 rotates. A spiral spring 126 has one of its ends 127 engaged in an aperture 128 in the hub 124 and its other end 129 engaged in an aperture 130 in the rim 131 of the rotatable member 116. The rim 131 is provided with a spiral groove 132 which is similar to the spiral groove 51 of the preferred form of the invention for limiting rotation of the rotatable member 116 to one complete revolution by means of the key 133 slidable in the slot 134 in a plate 135 secured to the cover 123 with the lug 136 of the key 133 riding in the spiral groove 132. The respective rotatable members 116 and 103 carry scales 137 and 138 similar to the scales of the preferred form. The lens mounting, hair-line, mask and trip arm are similar to that shown in the preferred form of the invention and given similar reference numerals.

In the operation of the preferred form of my invention, the casing can be either placed on a suitable support or held in the left hand of the user with the right hand engaging the hand knob 17. Assuming it is desired to multiply 2×3×4, the hand knob is rotated in a clock-wise direction until the number 2 on the answer scale registers with the hair-line. The trip lever 74 is then depressed by the fingers of the right hand causing the collar 40 to move inwardly releasing the frictional contact between the disc 30 and the rotatable member 45 which permits the spiral spring 60 to rotate the member 45 in a counter-clockwise direction to bring the multiplication scale back to unity, during which time the answer scale is held against rotation by the friction rings 20 and 21. The trip lever is then released causing the friction ring 47 to again engage the disc 30 with the rotatable member 45. The hand knob is turned in a clock-wise direction until the number 3 appears on the multiplication scale in registry with the hair-line. At this point the number 6 will be in registry with the cursor on the answer scale. The trip lever is again depressed permitting the multiplication scale to return to unity after which it is released and the hand knob rotated until the number 4 appears on the multiplication scale in registration with the cursor. The number now appearing on the answer scale in registration with the cursor will be 24, or the product of 2×3×4. In a like manner any other numbers can be multiplied and/or divided through the same procedure as just described, including square root, cube root, sines, cosines, tangents, and cotangents. When multiplying or dividing an equation not involving a whole number the answer scale must be set to unity before starting the calculation.

In the preferred form the coil spring 48 imposes sufficient tension on the member 45 through the friction ring 47 to maintain the member 45 in any turned position while being opposed by the spiral spring. The spring washer 19 maintains sufficient tension on the friction ring 20 to hold the hand knob and the rotatable member 14 in position during any reverse movement of the rotatable member 45.

The operation of the modified form of the invention is similar in its procedure with the exception that the members cannot be rotated in a reverse direction due to the type of clutch used to engage the members. The answer scale must always be brought around clock-wise to its unit position at the beginning of any series of calculations. The multiplication and division scale is releasable from the clutch arms by means of the trip lever engaging the cap 108 and causing the faces 109 to push the balls 117 outwardly for disengaging the ends of the arms with the inner face of the rotatable member 116 when it is desired to bring the member 116 back to unit position under the impetus of the spring 126.

It will thus be noted that the same procedure is followed in the modified form as in the preferred form of this invention, and it will be noted that the scale used for division is in the opposite direction to that of the multiplication scale, and that the readings for sines, cosines, tangents, and cotangents are set forth by degrees, which eliminates the necessity of finding the numerical values thereof.

In the modified form the arms 115' lock the rotatable member 103 against reverse movement while the arms 115 are disengaged from the rotatable member 116 through the trip arrangement to permit the spiral spring to return the member 116 to unit position.

From the foregoing, it will be seen that I have devised a compact, efficient slide rule, reducing the number of steps necessary to complete any given calculations in comparison to slide rules generally in use, and by means of the magnification of the scales great accuracy can be obtained from the plurality of scales incorporated on the single rotatable member. While I have shown and described various mathematical tables for the use of mechanical engineers and the like, it will be readily understood that comparable scales for other purposes might readily be substituted for the type of scale shown. It will be readily seen that it requires no special instructions to operate the device but merely the turning of the hand knob to bring the proper number or other indicated figure on either the multiplication or division scale in registration with the hair line, depressing the trip lever for automatically returning the multiplication and division scale to unit position and repeating this same procedure to complete the calculation, and reading the answer on the answer scale is all that is required to complete any calculation capable of being read on any of the combined scales.

Having thus fully described my invention, what I claim as new and desire to secure by Letters Patent, is:

1. In a rotary slide rule, a casing, a first disc in said casing, a hand knob outside said casing fastened to the disc and adapted to rotate it, a window in the casing bearing a mark, a scale carried by said disc in alignment with the window, a second disc in said casing, a scale carried by the second disc in alignment with the window, a spring-pressed coupling normally interconnecting the two discs, a motor spring in the casing for the second disc, and a pin projecting to the outside of the casing for actuating the coupling.

2. The rotary slide rule according to claim 1, and a stop for the second disc towards which the motor spring tends to rotate it.

3. The rotary slide rule according to claim 1, and in which the second disc is provided with a groove having overlapping ends, and a stop fixed to the casing and projecting in the groove.

4. The rotary slide rule according to claim 1, and in which means are provided to prevent the rotation of the first disc by the motor spring when the two discs are coupled.

5. The rotary slide rule according to claim 1, and in which means are provided to prevent the rotation of the second disc by the motor spring while the two discs are coupled.

6. In a rotary slide rule, a casing, a first disc in said casing, a hand knob outside of said casing fastened to the disc and adapted to rotate it, a coupling between said casing and disc, a window in the casing bearing a mark, a scale carried by said disc in alignment with the window, a second disc in said casing, a scale carried by the second disc in alignment with the window, a spring-pressed coupling normally operatively linking the two discs, means for limiting the rotation of the second disc with respect to the casing, a motor spring in the casing for the second disc, and a pin projecting to the outside of the casing for actuating the coupling to uncouple the two discs.

7. The rotary slide rule according to claim 6 and in which the coupling between the first disc and the casing is a friction coupling which overcomes the torque of the motor spring when the two discs are coupled.

8. The rotary slide rule according to claim 6, and in which a friction coupling is provided between the second and first discs which overcomes the torque of the motor spring while the two discs are linked by the spring-pressed coupling.

9. The rotary slide rule according to claim 6, and in which the second disc is provided with a spiral groove having overlapping ends, said stop projecting into said groove, the thickness of the stop and the extent of overlap being such as to allow a complete revolution of the second disc with respect to the casing.

10. In a rotary slide rule, a casing, a first disc in said casing, a hub projecting from the disc to the outside of said casing, a hand knob fastened to the hub, a spring-pressed friction ring between the end wall and the knob, a friction ring between the end wall and the disc, a window in the side wall having an apertured mask bearing suitable legends, a hair line on said window, a scale attached to said disc in alignment with the aperture and certain legend of the window mask, a second disc in said casing fastened to the first disc, a third disc rotatably mounted between the first and second discs, a plurality of scales carried by the third disc in alignment with certain other legends on the mask and the aperture in the window, a friction ring between the third and the second discs, a stop having a limited radial movement with respect to said casing and limiting, in turn, the rotation of the second disc to one complete revolution, a motor spring in the casing having one end fastened to the third disc and the other end to the casing, said friction rings overcoming the torque exerted by the motor spring on the discs while they are coupled, and a spring-pressed coupling including a pin projecting to the outside of the casing normally coupling the first to the third disc and adapted when axially displaced to uncouple said discs and allow the third disc to be rotated by the motor spring.

11. In a rotary slide rule, a casing having two parallel end walls and a polygonal side wall, a first disc in said casing adjacent one end wall and having an enlarged rim, a hub projecting from the disc through said one end wall to the outside and a hub projecting to the inside of said casing, a hand knob fastened to the outside hub adjacent said one end wall, a spring-pressed friction ring between the outer face of the end wall and the knob, a friction ring between the inner face of said end wall and the disc, a window in the side wall having an apertured mask bearing suitable legends, a hair line on said window, an answer scale attached to the rim of said disc in alignment with the aperture and certain legend of the window mask, a second disc in said casing fastened to the inwardly projecting hub of the first disc and also provided with a hub, a third disc rotatably mounted on the inwardly projecting hub of the first disc between the first and second discs, the third disc having an enlarged rim aligned with the rim of the first disc and a grooved edge of which encloses the edge of the second disc, a plurality of scales marked on the rim of the third disc in alignment with certain other legends on the mask and the aperture in the window, a friction ring fastened on the third disc and engaging the second disc near the periphery thereof, a fourth disc in said casing fastened to the other end wall and having a hub surrounding the hub of the second disc, the fourth disc having a slot in which a key is slidably mounted, a lug projecting from said key into the groove in the edge of said rim, said groove forming a complete spiral with its ends overlapping, a spiral spring within a chamber formed by the third and fourth discs and the rim of the third disc to which one end of said spring is fastened, the other end being fastened to the hub of the fourth disc, the friction exerted by the friction rings on the first and third discs being sufficient to overcome the torque exerted by the spiral spring on the discs and thus prevent the rotation thereof when said discs are coupled, a pin projecting through the hubs of the second, third and fourth discs and the other end wall to the outside of the casing, a head for said pin, a coiled spring within the hub of the first disc, normally pressing the pin head into frictional engagement with the third disc, and a spring-pressed lever mounted on the outside of the other end wall and adapted axially to displace the pin against the tension of the coiled spring to push the pin head out of engagement with the third disc.

BERNARD SASSEN.